United States Patent Office 2,989,550
Patented June 20, 1961

2,989,550
2-METHYL-11-OXYGENATED PROGESTERONES
Alan H. Nathan, William P. Schneider, and John A. Hogg, Kalamazoo Township, Kalamazoo County, Mich., assignors to The Upjohn Company, Kalamazoo, Mich., a corporation of Michigan
No Drawing. Filed Nov. 16, 1955, Ser. No. 547,307
4 Claims. (Cl. 260—397.3)

This invention relates to novel steroids, more particularly to 2-alkyl-11-oxygen-substituted-progesterones, a process for their production and intermediates thereto.

It is an object of the present invention to provide 2-alkyl-11-hydroxyprogesterone, 2 - alkyl-11-ketoprogesterone, 2-alkyl-11,21-dihydroxyprogesterone, 2 - alkyl-11-keto-21-hydroxyprogesterone, 21-esters thereof, the corresponding 9α-halo compounds, and intermediates in the production thereof. Another object is the provision of a process for their production. Other objects will be apparent to those skilled in the art to which this invention pertains.

The novel 2-alkyl-11-oxygen-substituted-progesterones of the present invention have the following general structural formula:

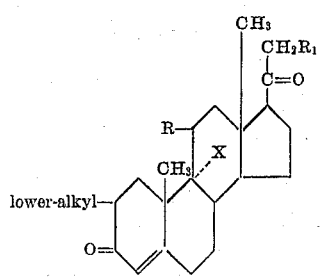

in which R is a member of the group consisting of α-hydroxy, β-hydroxy and keto, $R_1$ is a member of the group consisting of hydrogen, hydroxy, acyloxy, in which the acyl group is that of a hydrocarbon carboxylic acid containing from one to twelve carbon atoms, inclusive, X is a member of the group consisting of hydrogen and halogen having an atomic weight of from nineteen to 127, inclusive, and the lower-alkyl radical contains from one to eight carbon atoms, inclusive.

The novel 2-alkyl-11-oxygen-substituted-progesterones of the present invention, despite the absence of the dihydroxyacetone side chain, possess anti-inflammatory activity and are useful in the treatment of various arthritic conditions and the control of inflammatory conditions due to bacterial infections or allergic reactions of skin or mucous membrane. They are useful orally, as in tablets, or topically, as in ointments, lotions or creams. They are also useful as nervous system depresents and tranquilizers. Their activity is exemplified by 2-methyl-11β-hydroxyprogesterone which has about the same order of anti-inflammatory activity as hydrocortisone, a recognized therapeutically active anti-inflammatory agent. The 2-alkyl-11β,21-dihydroxyprogesterone and 2-alkyl-11-keto-21-hydroxyprogesterone and the 21-acyloxy esters thereof additionally posses marked mineralocorticoid activity.

According to the present invention, the novel 2-alkyl-11-hydroxyprogesterones and 2-alkyl-11-ketoprogesterones are prepared from 11-hydroxyprogesterone or 11-ketoprogesterone by a series of reactions which produce compounds illustratively represented by the following formulae:

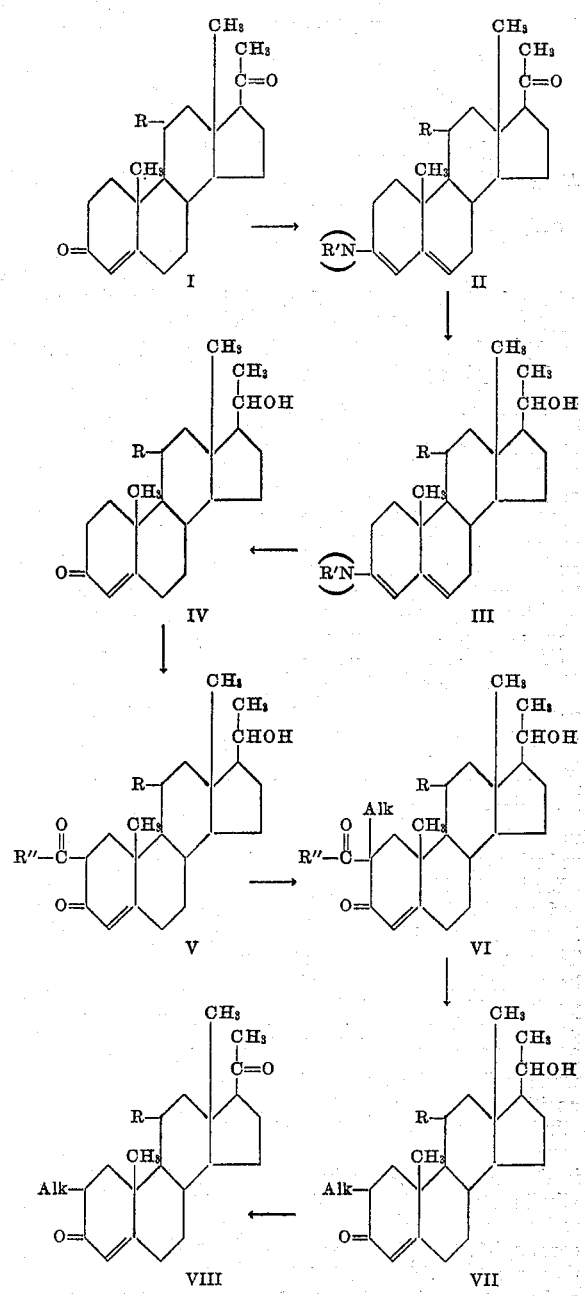

The 2-alkyl-11,21-dihydroxyprogesterone and 2-alkyl-11-keto-21-hydroxyprogesterone and their 21-esters are prepared from the 2-alkyl-11-ketoprogesterone and 2-alkyl-11-hydroxyprogesterone (VIII) by a following series of reactions which produce compounds which may be represented by the following formulae:

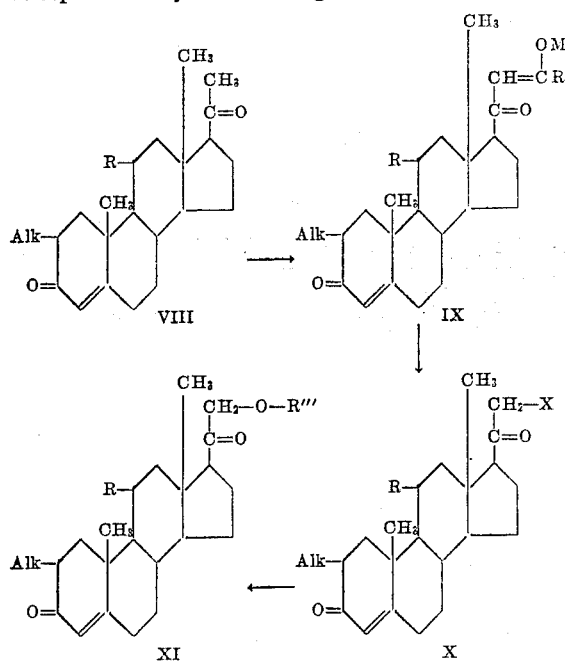

where, in the above formulae, Alk is a lower-alkyl group of from one to eight carbon atoms, inclusive, such as methyl, ethyl, propyl, isopropyl, butyl, octyl and the like; R is a hydroxy group having either the alpha or beta stereoconfiguration or a keto group, R' is an alkylene radical or alkoxyalkylene radical having from four to five carbon atoms between the valences and preferably a total of less than nine carbon atoms which, together with the amino nitrogen, forms a cyclic amino group preferably 1,4-butylene; R" is hydrogen, trifluoromethyl or carbo-lower-alkoxy, in which the lower-alkoxy group is, for example, methoxy, ethoxy, propoxy, butoxy, amyloxy, hexyloxy, heptyloxy or octyloxy; M is hydrogen or alkali metal; X is a halogen having an atomic weight from 35 to 127, inclusive; and R''' is hydrogen or the acyl radical of an organic carboxylic acid.

Starting with 11β-hydroxyprogesterone or 11-ketoprogesterone (I) the 3-enamine thereof (II) is produced, according to the procedure of Heyl and Herr, J. Am. Chem. Soc., 75, 1918 (1953), by reaction of the starting steroid with a secondary, preferably, cyclic amine, e.g., pyrrolidine, C-alkylpyrrolidines, piperidine or C-alkyl-piperidines. The resulting enamine is reduced with a reducing agent capable of reducing keto groups without affecting double bonds, e.g., lithium aluminum hydride, sodium aluminum hydride, diborane, etc., to produce the 3-enamine of 11β,20-dihydroxy-4-pregnen-3-one (III). The enamine group is then hydrolyzed, e.g., with aqueous base, preferably an alkanoic alkali-metal hydroxide, to produce 11β,20-dihydroxy-4-pregnen-3-one (IV). This compound, ordinarily in the form of a mixture of its 20α- and 20β-epimers, is then condensed with a compound which will produce a reactive carbonyl group at the 2-position, e.g., an alkyl formate, a dialkyl oxalate or an alkyl trifluoroacetate, in which the alkyl groups are methyl, ethyl, propyl, butyl, amyl, hexyl, heptyl, or octyl, in the presence of an alkali-metal alkoxide, alkali metal, alkali-metal hydride, alkali-metal amide, triphenylmethyl sodium, etc., to produce an alkali-metal enolate of a 2-carbonyl-11β,20-dihydroxy-4-pregnen-3-one (V), which is then reacted with an alkyl halide of from one to eight carbon atoms, inclusive, preferably methyl bromide or methyl iodide, to produce the corresponding 2-alkyl-2-carbonyl-11β,20-dihydroxy-4-pregnen-3-one (VI). The 2-carbonyl group of the resulting compound is then removed by a reversal reaction, i.e., with an alkanol and base or water and base, e.g., sodium methoxide and methanol, to produce 2-alkyl-11β,20-dihydroxy-4-pregnen-3-one (VII). This compound is then selectively oxidized by an Oppenauer oxidation to produce 2-alkyl-11β-hydroxyprogesterone (VIII, R is —OH) or completely oxidized with a strong oxidizing agent, e.g., chromic acid or sodium dichromate to produce 2-alkyl-11-ketoprogesterone (VIII, R is =O).

Employing 11α-hydroxyprogesterone as the starting steroid, the series of reactions described above is productive of 2-alkyl-11α-hydroxyprogesterone, if the oxidation is an Oppenauer oxidation. 2-alkyl-11-ketoprogesterone is produced, if the oxidizing agent is a strong one, e.g., chromic acid or sodium dichromate. 2-alkyl-11-ketoprogesterone, when diketalized, e.g., with ethylene glycol, to produce the 3,20-diketal thereof, and then reduced with, for example, lithium aluminum hydride or sodium borohydride, and the ketal groups then hydrolyzed with aqueous acid, e.g., dilute hydrochloric acid, is converted to 2-alkyl-11β-hydroxyprogesterone.

Reacting the thus-produced 2-alkyl-11-hydroxy- or 2-alkyl-11-ketoprogesterone with a compound producing a reactive carbonyl group at the 21-position, e.g., an alkyl formate, a dialkyl oxalate or an alkyl trifluoroacetate, in which the alkyl groups are methyl, ethyl, propyl, butyl, amyl, hexyl, heptyl or octyl, in the presence of an alkali-metal condensing agent, e.g., an alkali-metal alkoxide, alkali metal, alkali-metal hydride, alkali-metal amide, triphenyl-methyl sodium, etc., produces an alkali-metal enolate of 2-alkyl-11-oxygen-substituted-21-carbonyl-progesterone (IX). This compound, or the corresponding free enol, is halogenated with a molar equavalent of halogen having an atomic weight from 35 to 127, inclusive, preferably in the presence of a compound which will destroy the hydrogen halide as it is formed when the free enol is employed, e.g., potassium acetate, at a temperature between about minus forty and plus twenty degrees centigrade, to produce 2-alkyl-11-oxygen-substituted-21-haloprogesterone (X). Treatment of this compound with an alkali-metal salt of a lower-aliphatic or an aromatic acid, preferably a hydrocarbon carboxylic acid containing from one to twelve carbon atoms, inclusive, is productive of 2-alkyl-11-oxygen-substituted-21-acyloxyprogesterone (XI). Hydrolysis of this compound, e.g., with aqueous sodium bicarbonate, sodium hydroxide, etc., is productive of 2-alkyl-11-oxygen-substituted-21-hydroxyprogesterone (XI).

The alkali-metal salt of the esterifying acid used to convert Compound X to Compound XI may be the sodium, potassium, lithium, etc., salt of any of the following acids, potassium acetate being preferred: formic, propionic, butyric, isobutyric, valeric, isovaleric, trimethylacetic, 2-methylbutyric, 3-ethylbutyric, hexanoic, diethylacetic, triethylacetic, heptanoic, octanoic, the optically active abietic, α-ethylisovaleric, an acyclic acid, e.g., 3β-hydroxycholanic, 3β-hydroxyetiocholanic, cyclopropylideneacetic, a cycloaliphatic acid, e.g., cyclopentylformic, cyclopentylacetic, β-cyclopentylpropionic, cyclohexylpropionic, an aryl or alkaryl acid, e.g., benzoic, 2, 3 or 4-methylbenzoic, 2,3-, 2,4-, 2,5-, 2,6-, 3,4-, and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid (which can be converted to water soluble, e.g., sodium, salts) e.g., succinic, glutaric, α-methylglutaric, β-methylglutaric, β,β-dimethylglutaric, adipic, pimelic, suberic, a hydroxyacid, e.g., glycolic, lactic, citric, tartaric, d-maleic, d-glyceric, mannonic, gluconic, salicylic, an aminoacid, e.g., glycine, diglycollamic, triglycollamic, methylglycine, dimethylglycine, diethylglycine, para-aminosalicylic, para-aminobenzoic, other hetero-substituted acids, e.g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-napthoxyacetic, β-pyrrolidylpropionic, carbamic acids, e.g., carbamic acid, phenylcarbamic, n-butylcarbamic, dimethylcarbamic, diethylcarbamic, allophanic, or a heterocyclic acid, e.g., β-furylcarboxylic, N-methylpyrrolidyl-2-carboxylic, α-picolinic, indole-2-carboxylic, 6-hydroxyindolyl-3-acetic, N-methylmorpholyl-2-carboxylic, lysergic, pyrrolyl-2-carboxylic, or other acyl acid.

When the compound resulting from the reactions described above is 2-alkyl-11-hydroxy-21-acyloxyprogesterone, (XI, R is —OH), this compound can be oxidized with chromic acid or sodium dichromate or N-bromoacetamide in pyridine to 2-alkyl-11-keto-21-acyloxyprogesterone, wherein the acyloxy group is preferably acetoxy.

The oxidation of the 11-hydroxy compound (XI, R is —OH) is carried out in an acid medium using a suitable salt such as an alkali-metal salt of chromic acid. Examples of such salts are sodium dichromate, potassium dichromate and the like. Alternatively, chromium trioxide may be used in acetic acid. Alternatively, other oxidizing agents such as N-haloamides or N-haloimides may be used in an inert solvent such as acetone or a t-butanol-pyridine mixture. Examples of suitable N-haloamides are N-bromoacetamide, N-chloroacetamide, and the like, and suitable N-haloimides are N-chlorosuccinimide, N-bromosuccinimide, N-bromophthalimide and the like.

Reaction of 2-alkyl-11α-hydroxyprogesterone or 2-alkyl-11β-hydroxyprogesterone with an anhydrous mixture of N-bromoacetamide, sulfur dioxide and pyridine is productive of 2-alkyl-9(11)-dehydroprogesterone.

Reaction of 2-alkyl-9(11)-dehydroprogesterone with N-bromoacetamide in aqueous tertiary butanol containing a catalytic amount of perchloric acid is productive of 2-alkyl-9α-bromo-11β-hydroxyprogesterone which is converted with potassium or sodium acetate in acetone to 2-alkyl-9,11β-oxidoprogesterone. Reaction of the latter compound with anhydrous hydrogen fluoride or concentrated (ca. 40–50 percent aqueous) hydrofluoric acid in methylene chloride at about minus forty to plus forty degrees centigrade is productive of 2-alkyl-9α-fluoro-11β-hydroxyprogesterone. Substituting hydrogen chloride or concentrated hydrochloric acid for hydrogen fluoride or concentrated hydrofluoric acid, respectively, is productive of 2-alkyl-9α-chloro-11β-hydroxyprogesterone.

Formation of 2-alkyl-9(11)-dehydroprogesterone, e.g., 2-alkyl-4,9(11)-pregnadiene-3,20-diones, involves an intermediate step of the formation of an 11-hypohalite, the 11-hypohalite then being converted to the $\Delta^{9(11)}$-compound. The hypohalite forming reactant may be one which will form a steroid 11-hypohalite. Examples of such compounds are N-haloamides and N-haloimides such as N-chloroacetamide, N-bromoacetamide, N-chlorosuccinimide, N-bromosuccinimide, N-iodosuccinimide, N-bromophthalimide, 3-bromo-5,5-dimethyl hydantoin and 1,3-bromo-5,5-dimethyl hydantoin. Ordinarily, a proportion in excess of a molar equivalent, calculated on the starting 11-hydroxy steroid is employed.

The reaction is conducted in the presence of a basic compound, illustratively the tertiary amines whose amino nitrogen is a member of an aromatic ring, for example, the pyridines, i.e., pyridine, picoline, lutidine, collidine, conyrine, parvuline, and the like, the lower fatty acid amides, especially formamide, methyl formamide, and dimethyl formamide. The base is preferably employed in a molar excess, calculated on the starting 11-hydroxy steroid. The reaction is conducted under anhydrous conditions, i.e., where the reaction mixture contains less than one molar equivalent of water, calculated on the steroid. The reaction mixture preferably should contain less than 0.1 molar equivalent of water.

The reaction temperature is within the range of minus forty degrees centigrade to plus seventy degrees centigrade, inclusive. The lower limit is determined by the solubility of the reactants having a suitable reaction time, and the upper limit is determined by the amount of side reactions which normally accompany a reaction involving N-halo compounds at higher temperatures. Room temperature or below is preferred. The reaction time is ordinarily of short duration but in the case of some reactants may take as long as three hours or more. It has been found convenient to allow approximately thirty minutes for this step.

The 11-hypohalites are not usually separated as such, but are treated in situ with an anhydrous form of sulfur dioxide. The anhydrous sulfur dioxide can be in the form of gaseous or liquid sulfur dioxide or in the form of a material which produces sulfur dioxide under the conditions of the reaction, as for example, alkali-metal hyposulfites.

Alternatively, the $\Delta^{9(11)}$-compound may be made by reaction of the 2-alkyl-11-hydroxyprogesterone with a mixture of the N-halo compound and an organic base. The mixture is allowed to stand for about one-half hour to several hours, treated with anhydrous sulfur dioxide, and the $\Delta^{9(11)}$-steroid then recovered from the reaction mixture.

Introduction of the halohydrin group, i.e., the 9α-halo-11β-hydroxy grouping, is carried out preferably in an inert reaction mixture by means of N-haloamides or N-haloimides as employed in the previous step in the presence of a strong mineral acid such as sulfuric acid or perchloric acid, a suitable solvent and a mixture of methylene chloride and tertiary butanol, hexane, dioxane, and tetrahydrofuran. Considerable excess of hypohalous acid and prolonged reaction times should be avoided.

Conversion of 2-alkyl-9α-halo-11β-hydroxy-4-pregnene-3,20-dione to the 2-alkyl-9β,11β-epoxy-4-pregnene-3,20-dione is accomplished by means of a base such as anhydrous sodium acetate, aqueous sodium hydroxide and the like in an organic solvent such as acetone, methanol, ethanol, and the like. Pyridine may be used as the solvent, in which case it also acts as a base to give the epoxide compound directly.

Preparation of the 2-alkyl-9α-halo-11β-hydroxyprogesterone from the epoxide is carried out in an inert solvent such as chloroform, carbon tetrachloride, benzene, hexane, heptane or methylene chloride. Aqueous hydrogen fluoride in dioxane with boron trifluoride catalyst can be also used. The reaction is usually carried out at temperatures of thirty degrees or below, although temperatures between minus sixty degrees centigrade and plus fifty degrees centigrade are operable. Concentrated hydrochloric acid may be substituted to produce the 9α-chloro compound. The preferred operating temperature for either reactant is preferably between room temperature and zero degrees centigrade.

Reaction times required to achieve substantially complete reaction are ordinarily less than about eight hours for hydrogen chloride and less than about 24 hours for hydrogen fluoride. If a molar equivalent of the hydrogen halide is employed, the reaction time is not critical, after reaction at the oxide is substantially complete. However, when an excess of hydrogen halide is employed, particularly with hydrogen fluoride, the reaction time should be relatively short, e.g., less than about six hours at zero degrees centigrade.

As stated above, the reaction can be performed in the presence of an excess of the hydrogen halide, and the excess destroyed as with an alkali-metal sulfite or bicarbonate when the desired oxide opening reaction is substantially complete.

Likewise, 2-alkyl-9(11)-dehydroprogesterone can be reacted with a compound which will produce a reactive carbonyl group at the 21-position, e.g., an alkyl formate, a dialkyl oxalate or an alkyl trifluoroacetate, in which the alkyl group contains from one to eight carbon atoms, inclusive, in the presence of an alkali-metal condensing agent, e.g., an alkali-metal alkoxide, alkali metal, alkali-metal hydride, alkali-metal amide, triphenyl sodium, etc., to produce an alkali-metal enolate of 2-alkyl-9(11)-dehydro-21-carbonylprogesterone. This compound, either the enolate or the free enol, is then treated with a molar equivalent of halogen having an atomic weight from 35 to 127, inclusive, preferably iodine and suitably in the presence of a compound which will destroy the hydrogen halide as it is formed when the free enol is employed, e.g., potassium acetate at a temperature between minus forty and plus twenty degrees centigrade to produce 2-alkyl-9(11)-dehydro-21-haloprogesterone. Treatment of this compound with an alkali-metal salt of a lower-aliphatic acid or an aromatic acid, preferably a hydrocarbon carboxylic acid containing from one to twelve carbon atoms, inclusive, to produce 2-alkyl-9(11)-dehydro-21-acyloxyprogesterone. Reaction of this compound with N-bromoacetamide in aqueous tertiary butyl alcohol containing a catalytic amount of perchloric acid is productive of 2-alkyl-9α-bromo-11β-hydroxy-21-acyloxyprogesterone which is converted with potassium or sodium acetate in acetone to 2-alkyl-9,11β-oxido-21-acyloxyprogesterone. Reaction of the latter compound with anhydrous hydrogen fluoride or concentrated (ca. 40–50 percent aqueous) hydrofluoric acid in methylene chloride at about minus forty to plus forty degrees centigrade is productive of 2-alkyl-9α-fluoro-11β-hydroxy-21-acyloxyprogesterone. Substituting hydrogen chloride or concentrated hydrochloric acid for hydrogen fluoride or concentrated hydrofluoric acid, respectively, is productive of 2-alkyl-9α-chloro-11β-hydroxy-21-acyloxyprogesterone. The free 21-hydroxy compound can be produced by hydrolysis of the latter compound with an alkali-metal bicarbonate in methanol.

The 2-alkyl-9α-halo-11β-hydroxyprogesterones or 2-alkyl-9α-halo-11β-hydroxy-21-acyloxyprogesterones can be converted to the corresponding 11-keto compounds by chromic acid oxidation, e.g., chromic anhydride or alkali-metal dichromate in acetic acid.

The 2-alkyl-9α-halo-11-oxygen-substituted-progesterone and 2-alkyl-9α-halo-11-oxygen-substituted-21-acyloxyprogesterone described above, especially the 9α-fluoro compounds, possess marked anti-inflammatory and mineralocorticoid activity and are useful in the treatment of inflammatory conditions of the eyes, ears, skin and respiratory tract.

The formation of 2-alkyl-9α-halo-11β,21-dihydroxyprogesterone, 2-alkyl-9α-halo-11-keto-21-hydroxyprogesterone and the 21-acylates thereof is accomplished in the same manner as previously described for 2-alkyl-9α-halo-11-hydroxyprogesterone and 2-alkyl-9α-halo-11-ketoprogesterone. Using the 2-alkyl-4,9(11)-pregnadiene-3,20-diones as starting materials, the 21-position is converted to a 21-acyloxy group by the procedure previously described in the conversions of Compound VIII to Compound XI through the intermediates (IX) and (X), the 21-acyloxy group being characterized by an acyl group of lower-aliphatic or an aromatic acid, preferably a hydrocarbon carboxylic acid containing from one to twelve carbon atoms, inclusive. The 21-acyloxy compounds, i.e., the 2-alkyl-desoxycorticosterone acylates are then halogenated to form the 9α-bromo, the 9α-chloro, or the 9α-iodo compounds by means of the appropriate hypohalous acid to introduce the halohydrin grouping. Thereupon the 9α-halo compounds, for example 2-alkyl-9α-bromo-11β-hydroxy-21-acyloxyprogesterone, are epoxidized as described above regarding the 2-alkyl-9-α-halo-11β-hydroxyprogesterones. Subsequent reaction of these compounds, as for example, 2-alkyl-9,11-epoxy-21-acyloxyprogesterones with hydrogen fluoride and hydrogen chloride is carried out as described above for the conversion of 2-alkyl-9β,11β-epoxy-4-pregnene-3,20-dione to the 2-alkyl-9α-halo-11β-hydroxyprogesterone.

The novel 2-alkyl-11-oxygen-substituted-progesterones of the present invention are especially useful as pharmaceutical compositions and mixtures, e.g., ointments, lotions, jellies, creams, aqueous suspensions, etc., for topical use. Examples of especially advantageous pharmaceutical compositions are listed below. Although the examples are to the 2-methyl-9α-fluoro-11β-hydroxyprogesterone and 2-methyl-11β-hydroxy-21-acetoxyprogesterone, it is to be understood that molar equivalents of the other 2-lower-alkyl homologues, the 2-alkyl-11β-hydroxyprogesterones and the corresponding 11-keto compounds are substitutable therein.

The novel 2-methyl-9α-fluoro-11β-hydroxyprogesterone is advantageously employed in an ointment base for use in the treatment of topical inflammatory conditions. A suitable dermatological and ophthalmic ointment has the following composition:

| | Lbs. |
|---|---|
| 20 percent wool fat, U.S.P. | 100 |
| 25 percent mineral oil, U.S.P. | 125 |
| 0.1 percent 2-methyl-9α-fluoro-11β-hydroxyprogesterone | 0.5 |
| White petroleum, U.S.P., q. s.-ad | 500 |

Incorporation af an antibiotic in the ointment, especially neomycin sulfate, has therapeutic advantages, each active ingredient potentiating and supplementing the useful properties of the other. Such an ointment is as follows:

| | Lbs. |
|---|---|
| 20 percent wool fat, U.S.P. | 100 |
| 25 percent mineral oil, U.S.P. | 125 |
| 0.6 percent neomycin sulfate (micro atomized) | 3 |
| 0.2 percent 2-methyl-9α-fluoro-11β-hydroxyprogesterone | 1 |
| White petroleum, U.S.P., q. s.-ad | 500 |

In place of, or in addition to, neomycin sulfate, other antibiotics such as bacitracin, circulin, polymyxin B sulfate, gramicidin, streptomycin sulfate, dihydrostreptomycin sulfate, oxytetracylcine, chlortetracycline, albamycin, tetracycline, chloramphenicol and the sulfonamides can be used to enhance the usefulness of the above ointments.

An injectable composition suited for suspending the compounds of the present invention having advantages in the treatment of Addisonian crisis and shock is as follows:

| | Mg. |
|---|---|
| Sodium citrate, U.S.P. | 5.7 |
| Sodium carboxymethylcellulose, low viscosity | 5.0 |
| Plasdone (polyvinylpyrrolidone) | 5.0 |
| Polysorbate 80, U.S.P. | 4.0 |
| Sterile methylparaben, U.S.P. | 1.5 |
| Sterile propylparaben, U.S.P. | 0.2 |
| 2-methyl-11β-hydroxy-21-acetoxyprogesterone | 5.0 |
| Water for injection, q.s.-ad., 1.0 cc. | |

The suspending agents in this vehicle, in this case the combination of polyvinylpyrrolidone-sodium carboxymethylcellulose, or a polyalkylene glycol, are particularly useful when used in conjunction with the novel physiologically active steroids of the present invention.

Another composition suitable for injection has the following composition:

| | Gram |
|---|---|
| Sterile micronized 2-methyl-11β-hydroxy-21-acetoxyprogesterone | 0.3 |
| Polyethylene glycol 4000 | 3.0 |
| Sodium chloride, U.S.P. | 0.9 |
| Polysorbate 80, U.S.P. | 0.4 |
| Benzyl alcohol, N.F. | 0.9 |
| Water for injection, q.s.-ad., 100 cc. | |

The polyethylene glycol, sodium chloride, polysorbate 80 and benzyl alcohol are dissolved in water and the solution sterilized by filtration. Sterile 2-methyl-11β-hydroxy-21-acetoxyprogesterone is then aseptically mixed with the sterile vehicle and the whole homogenized.

The following preparation and examples are illustrative of the process and products of the present invention, but are not to be construed as limiting.

PREPARATION

3-pyrrolidyl enamine of 11-ketoprogesterone

To a hot solution of 3.28 grams of 11-ketoprogesterone in twenty milliliters of methanol was added three milliliters of pyrrolidine. The solution was permitted to cool to room temperature and then chilled to five degrees centigrade for two hours. The crystalline precipitate was filtered and washed with twenty milliliters of cold methanol. There was thus obtained 3.77 grams, a yield of 99 percent of the theoretical, of the 3-enamine of 11-ketoprogesterone melting at 184 to 187 degrees centigrade [Heyl and Herr, J. Am. Chem. Soc. 75, 1918 (1953)].

Following the procedure of this preparation, other 3-enamines of 11-ketoprogesterone are prepared, e.g., the 3-morpholinyl, 3-piperidyl, 3-(2'-methylpyrrolidyl), 3- (3'-methylpyrrolidyl) enamine or other 3-(ring-alkylated- pyrrolidyl) or 3-(ring-alkylatedpiperidyl) enamine, by the reaction of 11-ketoprogesterone with the corresponding secondary cyclic amine.

Similarly, the 3-enamines, e.g., 3-pyrrolidyl enamine, of 11β-hydroxyprogesterone and 11α-hydroxyprogesterone are prepared by the reaction of 11β-hydroxyprogesterone and 11α-hydroxyprogesterone, respectively, and the appropriate secondary cyclic amine, e.g., pyrrolidine.

EXAMPLE 1

The 3-pyrrolidyl enamine of 11β,20-dihydroxy-4-pregnen-3-one

To a stirred solution of 0.914 gram of lithium aluminum hydride in dry ether and under a nitrogen atmosphere was slowly added a solution of 3.81 grams (0.01 mole) of the 3-enamine of 11-ketoprogesterone (3-pyrrolidyl-3,5-pregnadienes-3,20-dione) in forty milliliters of dry benzene. After stirring the solution for 1.25 hours, 3.8 milliliters of ethyl acetate was added dropwise thereby producing a gelatinous precipitate. Ten milliliters of water was added and the ether distilled. The residual solids consisted of inorganic compounds and a mixture of the 3-pyrrolidyl enamine of 11β,20α - dihydroxy-4- pregnen-3-one and the 3-pyrrolidyl enamine of 11β,20β- dihydroxy-4-pregnen-3-one. This mixture of steroids can be isolated by filtering the solids, drying the filter cake at room temperature and then extracting it thoroughly with methanol. The methanol extract is then stripped of solvent leaving a residue of the 3-pyrrolidyl enamine of 11β,20-dihydroxy-4-pregnen-3-one which can be further purified by crystallization in dry methanol.

Following the procedure described above, other 3-enamines, e.g., the enamines described hereinbefore, of 11-ketoprogesterone or the 3-pyrrolidyl or other enamine of 11α-hydroxyprogesterone or 11β-hydroxyprogesterone are reduced to the corresponding enamine of 11,20-dihydroxy-4-pregnen-3-one, the 11-hydroxy group of the reaction product, in the case of the 11-hydroxyprogresterones, having the stereoconfiguration of the starting steroid.

EXAMPLE 2

11β,20-dihydroxy-4-pregnen-3-one

The unpurified residual solids from the reduction of the 3-enamine of 11-ketoprogesterone described in Example 1 and consisting of inorganic solids and a mixture of the 3-pyrrolidyl enamine of 11β,20α - dihydroxy-4- pregnen-3-one and the 3-pyrrolidyl enamine of 11β,20β- dihydroxy-4-pregnen-3-one was mixed with fifty milliliters of methanol. When most of the solids had dissolved, forty milliliters of a five percent aqueous sodium hydroxide solution was added. After stirring the mixture for 45 minutes, the solvent was removed at reduced pressure and the solid residue washed with dilute hydrochloric acid and then with water. The washed solids were dried at reduced pressure over concentrated sulfuric acid to give 3.29 grams, a yield of 99 percent of the theoretical, of a mixture of 11β,20α-dihydroxy-4-pregnen-3-one and 11β,20β-dihydroxy-4-pregnen-3-one melting at 108 to 112 degrees centigrade.

Similarly, other 3-enamines, e.g., piperidyl, 2'-methylpyrrolidyl, 2'-methylpiperidyl, of 11β,20 - or 11α,20-dihydroxy-4-pregnen - 3-one are hydrolyzed to the corresponding free ketosteroid.

EXAMPLE 3

Sodium enolate of 2-methoxyoxalyl-11β,20-dihydroxy-4-pregnen-3-one

To a stirred solution of 3.25 grams of 11β,20-dihydroxy-4-pregnen-3-one (melting point, 108–112 degrees centigrade), obtained as the product of the reaction described in Example 2, in fifty milliliters of dry tertiary butyl alcohol, under a nitrogen atmosphere, was added 2.75 milliliters of diethyl oxalate and 4.5 milliliters of a 25 percent methanolic solution of sodium methoxide. A thick precipitate of the sodium enolate of 2-methoxyoxalyl-11β,20- dihydroxy-4-pregnen-3-one appeared immediately. Stirring was continued for one hour and then 100 milliliters of dry ether were added, the mixture filtered and the filter cake washed with another 100 milliliters of dry ether. There was thus obtained an almost quantitative yield of a mixture of the sodium enolate of 2-methoxyoxalyl-11β, 20α-dihydroxy-4-pregnen-3-one and the sodium enolate of 2-methoxyoxalyl-11β,20β-dihydroxy-4 - pregnen-3-one, the mixture giving a positive ferric chloride test.

The free enol, 2-methoxyoxalyl-11β,20 - dihydroxy-4- pregnen-3-one is prepared by neutralizing a cold aqueous solution of the sodium enolate with cold dilute hydrochloric acid and separating and drying the precipitated 2- methoxyoxalyl-11β,20-dihydroxy-4-pregnen-3-one.

Following the procedure of Example 3, but substituting ethyl formate for the diethyl oxalate, there is thus produced the sodium enolate of 2-formyl-11β,20-dihydroxy- 4-pregnen-3-one. Substituting ethyl-trifluoroacetate for the diethyl oxalate in the reaction described in Example 3 is productive of 2-trifluoroacetyl-11β,20-dihydroxy-4- pregnen-3-one.

Similarly, starting with 11α,20-dihydroxy-4-pregnen-3- one, as the starting steroid in the reactions described above, there is thus produced the sodium enolate of 2- ethoxyoxalyl-11α,20-dihydroxy-4-pregnen - 3-one, the sodium enolate of 2-formyl-11α,20-dihydroxy-4-pregnen-3- one and the sodium enolate of 2-trifluoroacetyl-11α,20- dihydroxy-4-pregnen-3-one, respectively.

EXAMPLE 4

2-methyl - 2 - methoxyoxalyl-11β,20-dihydroxy-4-pregnen-3-one

The sodium enolate of 2-methoxyoxalyl - 11β,20-dihydroxy-4-pregnen-3-one obtained as the product of the reaction described in Example 3 was mixed with 100 milliliters of acetone, 3.2 grams of anhydrous potassium carbonate and seven milliliters of methyl iodide. The mixture was shaken vigorously for seventy hours in a closed container. The precipitate from the reaction was filtered, washed with three portions of acetone and the combined filtrate and washes were evaporated to dryness, leaving a residue of 2-methyl-2-methoxyoxalyl-11β,20-dihydroxy-4-pregnen-3-one.

Following the procedure of Example 4, but substituting the sodium enolate of 2-formyl-11β,20-dihydroxy-4- pregnen-3-one or of 2-trifluoroacetyl-11β,20-dihydroxy-4- pregnen-3-one as the starting steroid, there is thus produced 2-methyl-2-formyl-11β,20 - dihydroxy - 4-pregnen-3-one and 2-methyl-2-trifluoroacetyl-11β,20-dihydroxy-4- pregnen-3-one, respectively.

Likewise, following the procedure of Example 4, but substituting ethyl iodide or isopropyl iodide for the methyl iodide, there is produced 2-ethyl-2-methoxyoxalyl-11β,20- dihydroxy-4-pregnen-3-one and 2-isopropyl - 2 - methoxyoxalyl-11β,20-dihydroxy-4-pregnen - 3-one, respectively.

Similarly, the 11α-hydroxy isomers of the above-described compounds are prepared by substituting the corresponding 11α-hydroxy isomers, i.e., the sodium enolate of 2-ethoxyoxalyl-11α,20-dihydroxy-4-pregnen-3-one, the sodium enolate of 2-formyl-11α,20-dihydroxy-4-pregnen-3-one and the sodium enolate of 2-trifluoroacetyl-11α,20-dihydroxy-4-pregnen-3-one, respectively, as the starting steroid.

EXAMPLE 5

*2-methyl-11β,20-dihydroxy-4-pregnen-3-one*

The residue obtained as the product of the reaction described in Example 4 was dissolved in fifty milliliters of methanol and then stirred with two milliliters of a 25 percent methanolic solution of sodium methoxide for 1.5 hours at room temperature. The mixture was then poured into water. The yellow precipitate was separated by filtration, washed with water and dried in a vacuum desiccator over sulfuric acid. There was thus obtained 2.1 grams of crude 2-methyl-11β,20-dihydroxy-4-pregnen-3-one which was dissolved in benzene and then poured over a chromatographic column packed with eighty grams of synthetic magnesium silicate. The column was developed with 150-milliliter portions of solvent of the following composition and order: three of Skellysolve B hexanes plus 7.5 percent acetone, five of Skellysolve B plus ten percent acetone, five of Skellysolve B plus 12.5 percent acetone, and two of Skellysolve B plus fifteen percent acetone.

The less polar 2-methyl-11β,20-dihydroxy-4-pregnen-3-one which was eluted with Skellysolve B plus ten percent acetone melted, after crystallization from ethyl acetate, at 205 to 205.5 degrees centigrade and had the analysis below.

Calculated for $C_{22}H_{34}O_3$: C, 76.26; H, 9.89. Found: C, 76.61; H, 9.67.

The more polar 2-methyl-11β,20-dihydroxy-4-pregnen-3-one which was eluted with Skellysolve B plus 12.5 percent acetone melted, after crystallization from acetone, at 188 to 189 degrees centigrade and had the analysis below.

Calculated for $C_{22}H_{34}O_3$: C, 76.26; H, 9.89. Found: C, 76.42; H, 9.64.

The overall yield of 2-methyl-11β,20-dihydroxy-4-pregnen-3-one from 11-ketoprogesterone was 23 percent.

Similarly, 2-methyl-11β,20-dihydroxy-4-pregnen-3-one is also the hydrolysis product of a reaction as described in Example 5 which employs 2-methyl-2-formyl-11β,20-dihydroxy-4-pregnen-3-one or 2-methyl-2-trifluoroacetyl-11β,20-dihydroxy-4-pregnen-3-one as the starting steroid.

2-methyl-11α,20-dihydroxy-4-pregnen-3-one is the hydrolysis product of a reaction as described in Example 5 which employs 2 - methyl - 2 - ethoxyoxalyl-11α,20-dihydroxy-4-pregnen-3-one, 2-methyl-2-formyl-11α,20 - dihydroxy-4-pregnen-3-one or 2-methyl-2-trifluoroacetyl-11α,20-dihydroxy-4-pregnen-3-one as the starting steroid.

EXAMPLE 6

*2-methyl-11-ketoprogesterone*

When either 2-methyl-11β,20α-dihydroxy-4-pregnen-3-one, 2-methyl-11β,20β-dihydroxy-4-pregnen-3-one or a mixture of the two epimers was oxidized at room temperature, according to techniques known in the art, in acetic acid containing a fifteen to twenty percent excess over the theoretical requirement of chromium trioxide for one to 1.5 hours, the steroid product separated by pouring the reaction mixture in water or extracting it with ether or other water-immiscible solvent and the steroidal product isolated and dried, 2-methyl-11-ketoprogesterone melting at 187 to 189 degrees centigrade was obtained. A sample recrystallized from a mixture of acetone and ethyl acetate melted at 193 to 194 degrees centigrade and had the analysis below.

Calculated for $C_{22}H_{30}O_3$: C, 77.15; H, 8.83. Found: C, 77.31; H, 9.14.

Similarly, 2-methyl-11-ketoprogesterone is also the reaction product in a reaction as described in Example 6 in which 2-methyl-11α,20-dihydroxy-4-pregnen-3-one is the starting steroid.

EXAMPLE 7

*2-methyl-11β-hydroxyprogesterone*

A solution of 1.58 grams of a mixture of the epimers of 2-methyl-11β,20-dihydroxy-4-pregnen-3-one in a mixture of 35 milliliters of toluene and fifteen milliliters of cyclohexanone was heated until about ten milliliters were distilled to dry the solution. To the dry solution was added 1.5 grams of aluminum phenoxide and the resulting yellow solution was refluxed for eight hours. A saturated aqueous solution of sodium potassium tartrate in excess of the amount theoretically necessary was added and the solvents then removed by steam distillation. The residue was extracted with methylene chloride which was then dried and poured over a chromatographic column of 150 grams of synthetic magnesium silicate. The 2-methyl-11β-hydroxyprogesterone was eluted from the column with Skellysolve B plus ten percent acetone and, after crystallization from a mixture of acetone and ethyl acetate, melted at 240 to 243 degrees centigrade and had the analysis below.

Calculated for $C_{22}H_{32}O_3$: C, 76.70; H, 9.36. Found: C, 76.75; H, 9.50.

2-methyl-11β-hydroxyprogesterone is also prepared from 2-methyl-11β,20-dihydroxy-4-pregnen-3-one by diformylation or di(trifluoroacetylation) of the latter compound to produce 2-methyl-11β,20-diformyloxy-4-pregnen-3-one (melting point, 183 to 186 degrees centigrade) and 2 - methyl - 11β,20-di(trifluoroacetoxy)-4-pregnen-3-one, respectively, which are hydrolyzed with a mild base, e.g., sodium bicarbonate, to 2-methyl-11β-formyloxy-20-hydroxy-4-pregnen-3-one and 2-methyl-11β-trifluoroacetoxy-20-hydroxy-4-pregnen-3-one, respectively. Oxidation of these compounds with chromic acid, sodium dichromate, N-bromoacetamide in pyridine, etc., is productive of 2-methyl-11β-formyloxyprogesterone (melting point, 166.5 to 167.5 degrees centigrade) and 2-methyl-11β-trifluoroacetoxyprogesterone, respectively. Hydrolysis of these compounds with strong alkali, e.g., sodium hydroxide in aqueous methanol, is productive of 2-methyl-11β-hydroxyprogesterone.

Following the procedure of Example 7, but substituting 2-ethyl-11β,20-dihydroxy-4-pregnen-3 - one, produced by the reaction of a methanolic solution of sodium methoxide on a solution of 2-ethyl-2-methoxy-oxalyl-11β,20 dihydroxy-4-pregnen-3-one according to the procedure of Example 5, there is produced 2-ethyl-11β-hydroxyprogesterone.

EXAMPLE 8

*2-methyl-11β-hydroxy-21-acetoxyprogesterone*

To a solution of 2.06 grams (six millimoles) of 2 methyl-11β-hydroxyprogesterone in 120 milliliters of benzene was added 1.4 milliliters of diethyl oxalate followed by 1.58 milliliters of 25 percent methanolic sodium methoxide. After one-half hour, a small precipitate appeared from the yellow solution. Fifty milliliters of dry ether was added to the mixture followed by forty milliliters of dry ether one hour later. The resulting precipitate was collected, washed with ether and dried at reduced pressure to give a quantitative yield of the sodium enolate of 2-methyl-11β-hydroxy-21-ethoxyoxalylprogesterone.

All except about 25 milligrams of the thus-obtained sodium enolate was dissolved in fifty milliliters of methanol to which was added, at minus ten degrees centigrade and over a period of thirteen minutes, 1.52 grams of iodine in thirty milliliters of methanol. The iodine color was discharged immediately but the resulting cloudy yellowish green solution became darker upon standing. The mixture was stirred for one hour at minus ten to zero degrees centigrade, then 1.38 milliliters of 25 percent methanolic sodium methoxide (six millimoles) was added thereto, followed by a volume of water about equal to the volume of the mixture, added dropwise. The resulting solution and precipitate were poured into 300 milliliters of an aqueous sodium chloride solution. The pale yellow precipitate was filtered, washed with water and dried in a vacuum desiccator. There was obtained 2.358 grams of 2-methyl-11β-hydroxy - 21 - iodoprogesterone melting at about 100 degrees and decomposing with blackening at 145 to 148 degrees centigrade. The product gave a strong Beilstein test for halogen.

2-methyl-11β-hydroxy-21-iodoprogesterone, when chromatographed over a column of Florisil synthetic magnesium silicate which is developed with Skellysolve B hexane hydrocarbons containing increasing proportions of acetone, is eluted with Skellysolve B plus 7.5 percent acetone as a white amorphous solid. After crystallization from a mixture of methanol and water, the 2-methyl-11β hydroxy-21-iodoprogesterone melts with decomposition at 140 to 141 degrees centigrade.

A mixture of two grams of crude 2-methyl-11β-hydroxy-21-iodoprogesterone, 16.7 grams of potassium acetate, ten millimiters of glacial acetic acid and 385 milliliters of acetone was heated for five hours at the refluxing temperature of the mixture. Most of the acetone was removed at reduced pressure, the residue extracted with benzene which was then washed with water, dried and poured over a column of 125 grams of Florisil synthetic magnesium silicate. The column was developed with 300-milliliter portions of solvent of the following composition and order: five of Skellysolve B hexane hydrocarbons plus 7.5 percent acetone, six of Skellysolve B plus ten percent acetone and two of Skellysolve B plus fifteen percent acetone. The second through sixth Skellysolve B plus ten percent acetone and the first Skellysolve B plus fifteen percent acetone eluates contained 0.854 gram of 2-methyl 11β-hydroxy-21 - acetoxyprogesterone, the highest melting fraction melting at 181 to 182.5 degrees centigrade.

Following the precedure described in Example 8, but substituting 2-methyl-11-ketoprogesterone as the starting steriod, there is successively produced the sodium enolate of 2 - methyl - 11 - keto-21-ethoxyoxalylprogesterone, 2-methyl-11-keto-21-iodoprogesterone and finally 2-methyl 11-keto-21-acetoxyprogesterone. 2-methyl-11β-hydroxyprogesterone is similarly converted to the corresponding 11β-hydroxy compounds.

Substituting another alkali-metal acylate for the potassium acetate used in the last reaction described in Example 8, e.g., sodium or potassium formate, propionate, butyrate, valerate, hexanoate, heptanoate, octanoate, tertiary butylacetate, dimethylacetate, trimethylacetate, benzoate, furanoate, phenylacetate, phenylpropionate, cyclopentylformate, cyclopentylacetate, cyclopentylpropionate, 2,4,6-trimethylbenzoate, α-naphthoate, β-naphthoate, etc., other 2-methyl-11β-hydroxy-21-acyloxyprogesterones are prepared wherein the acyl radical is that of the alkali-metal acylate employed. The corresponding 2-methyl 11-keto-21-acyloxyprogesterones and 2-methyl - 11β-hydroxy-21 - acyloxyprogesterones are similarly prepared starting with 2-methyl-11-ketoprogesterone and 2-methyl 11α-hydroxyprogesterone, respectively.

These 2-methyl-11-oxygen-substituted - 21 - acyloxyprogesterones can also be prepared by the following sequence of reactions: reacting 11α-hydroxy-, 11β-hydroxy- or 11-ketoprogesterone with at least two molar equivalents each of an alkali-metal condensing agent, e.g., sodium methoxide, and a dialkyl oxalate, e.g., diethyl or dimethyl oxalate, to produce the sodium dienolate of 2,21 diethoxyoxalyl-11-oxygen - substituted - progesterone; monon-iodination of the sodium dienolate in the manner described in Example 8; reacting the thus-produced sodium enolate of 2-ethoxy-oxalyl-11-oxygen-substituted-21 iodoprogesterone with an alkali-metal acylate, e.g., potassium acetate, to produce the sodium enolate of 2-ethoxyoxalyl-11-oxygen-substituted - 21 - acyloxyprogesterone which is then methylated with methyl iodide, in the manner described above, to produce 2-methyl-2-ethoxyoxalyl-11 - oxygen - substituted-21-acyloxyprogesterone which is converted with an alkali-metal base, e.g., sodium methoxide, and methanol to 2-methyl-11-oxygen-substituted-21-acyloxyprogesterone.

EXAMPLE 9

*2-methyl-4,9(11)-pregnadiene-3,20-dione*

Six grams (17.5 millimoles) of 2-methyl-11β-hydroxyprogesterone was dissolved in fifty milliliters of dry pyridine. The air was purged from the solution with nitrogen gas, and 2.4 grams of N-bromoacetamide added. The mixture was stirred in the dark for a period of thirty minutes, and then sulfur dioxide was passed over the surface of the mixture at such a rate that the temperature did not exceed thirty degrees centigrade. When the mixture no longer gave a positive test with acidified starch-iodide paper, 120 milliliters of water were added. The mixture was stirred for a period of thirty minutes, cooled at zero degrees centigrade for a period of three hours and then filtered. The product was washed with 100 milliliters of five percent sulfuric acid and 200 milliliters of water. After drying at seventy degrees centigrade for three hours, the yield was 5.42 grams. The product was recrystallized from acetone-Skellysolve B to give 4.74 grams of 2-methyl-4,9(11)-pregnadiene-3,20-dione (83.2 percent of theoretical); M.P. 150–155 degrees centigrade, [α]$_D$ plus 181 degrees (acetone).

*Analysis.*—Calculated for $C_{22}H_{30}O_2$: C, 81.00; H, 9.33. Found: C, 80.52; H, 9.27.

Proceeding exactly as above, but substituting 2-ethyl-11β - hydroxyprogesterone, 2 - ethyl - 4,9(11) - pregnadiene-3,20-dione is produced.

EXAMPLE 10

*2-methyl-9α-bromo-11β-hydroxy-4-pregnene-3,20-dione*

4.24 grams (13.0 millimoles) of 2-methyl-4,9(11)-pregnadiene-3,20-dione was dissolved in 127 milliliters of methylene chloride and 210 milliliters of t-butanol. To this solution was added over a period of fifteen minutes at a temperature in the range of 25 degrees to thirty degrees centigrade with a solution of 10.6 milliliters of seventy percent perchloric acid dissolved in 75 milliliters of water and a solution of 1.75 grams of N-bromoacetamide dissolved in 75 milliliters of t-butanol. Excess reagent was decomposed by a solution of 2.1 grams of sodium sulfite in 100 milliliters of water. The reaction mixture was concentrated in vacuo to approximately 420 milliliters and cooled to twenty degrees centigrade. It was diluted with 400 milliliters of water and cooled to ten degrees centigrade for a period of thirty minutes. The product was filtered, washed with water, and dried in vacuo at room temperature for two hours; yield, 5.06 grams (85.5 percent of theoretical).

In exactly the same manner, but substituting 2-ethyl-4,9(11) - pregnadiene - 3,20 - dione, 2 - ethyl - 9α-bromo-11β-hydroxy-4-pregnene-3,20-dione is produced.

EXAMPLE 11

*2-methyl-9β,11β-epoxy-4-pregnene-3,20-dione*

5.06 grams (12.0 millimoles) of 2-methyl-9α-bromo-11-β-hydroxy-4-pregnene-3,20-dione was dissolved in 125 milliliters of acetone. Five grams of anhydrous sodium acetate was added, and the mixture was refluxed for a period of sixteen hours. The reaction mixture was concentrated in vacuo to sixty milliliters and was diluted with sixty milliliters of water with cooling. The diluted mixture was cooled to zero degrees centigrade for a period of thirty minutes, filtered, washed with water, and dried in vacuo to give 3.77 grams of crude product. This was recrystallized from acetone-Skellysolve B to give 3.02 grams (73.6 percent theoretical) of 2-methyl-9β,11β-epoxy-4-pregnene-3,20-dione, M.P. 150–151 degrees centigrade.

In exactly the same manner as above, but substituting 2-ethyl-9α-bromo-11β-hydroxy-4-pregnene-3,20-dione, 2-ethyl-9β,11β-epoxy-4-pregnene-3,20-dione is produced.

EXAMPLE 12

*2-methyl-9α-fluoro-11β-hydroxyprogesterone*

3.02 grams (8.84 millimoles) of 2-methyl-9β,11β-epoxy-4-pregnene-3,20-dione was dissolved in thirty milliliters of methylene chloride and vigorously stirred at room temperature with fifteen milliliters of 48 percent aqueous hydrofluoric acid for a period of sixteen hours. The mixture was poured into 500 milliliters of ice and water containing an excess of sodium bicarbonate to neutralize the acid. The product was extracted with methylene chloride. The extracts were evaporated to dryness to give 3.44 grams of crude product. This material was chromatographed over 275 grams of Florisil. Two (2.0) grams of the product was eluated in six fractions of ten percent acetone in Skellysolve B. This was recrystallized from ethyl acetate-Skellysolve B to give 1.38 grams (43.1 percent theoretical), in three crops; M.P. 262–266 (uncorrected); $[\alpha]_D$ plus 212 degrees (acetone).

*Analysis.*—Calculated for $C_{22}H_{31}O_3F$: C, 72.95; H. 8.62; F, 5.24. Found: C, 73.50; H, 8.46; F, 4.96.

In exactly the same manner, but substituting 2-ethyl-9β,11β - epoxy - 4 - pregnene - 3,20 - dione, 2 - ethyl-9α,11β-hydroxyprogesterone is produced.

EXAMPLE 13

*2-methyl-9α-fluoro-11-ketoprogesterone*

The products of Example 12 are each oxidized with chromium trioxide in acetic acid to give 2-methyl-9α-fluoro-11-ketoprogesterone (M.P. 193–195 degrees centigrade), and 2-ethyl-9α-fluoro-11-ketoprogesterone, respectively. In exactly the same manner as Example 12, above, but substituting 37 percent hydrochloric acid for the hydrofluoric acid, 2-methyl-9α-chloro-11β-hydroxyprogesterone and 2-ethyl-9α-chloro-11β-hydroxyprogesterone are produced, respectively. These two compounds are oxidized as in Example 13 with chromium trioxide in acetic acid to produce, respectively, 2-methyl-9α-chloro-11-keto-progesterone and 2-ethyl-9α-chloro-11-ketoprogesterone.

EXAMPLE 14

*9(11)-dehydro-2-methyl-desoxycorticosterone acetate*

Three (3.00) grams of 2-methyl-4,9(11)-pregnadiene-3,20-dione as produced in Example 9 was dissolved in about sixty milliliters of benzene. Some of the solvent was distilled from the solution to remove moisture, hereupon 2.5 milliliters of ethyl oxalate was added, followed by the addition of 2.5 milliliters of 25 percent methanolic sodium methoxide. After a period of thirty minutes, the solvent was removed under reduced pressure, leaving a residue which gave a strong ferric chloride test in ethanol. This residue was dissolved in fifty milliliters of methanol, cooled to minus ten degrees centigrade and treated with 2.34 grams of iodine in fifty milliliters of methanol over a period of twenty minutes. The solution was let stand for another period of twenty minutes whereupon water and an aqueous solution of sodium chloride were added. The dark yellow precipitate was extracted with ethylene chloride, and the extract was washed with water and evaporated to dryness. The product, 2-methyl-21-iodo-4,9(11)-pregnadiene-3,20-dione was a red colored oil. It was treated with 25 grams of anhydrous potassium acetate dissolved in fifteen milliliters of acetic acid and 500 milliliters of acetone, and the reaction mixture refluxed for a period of five hours. The acetone was evaporated at the end of five hours, leaving 3.05 grams of amorphous yellow residue, the crude 9(11)-dehydro-2-methyl-desoxycorticosterone acetate, M.P. ca. 105–135 degrees centigrade. The latter was chromatographed on 270 grams of Florisil magnesium silicate, collecting 300-milliliter fractions as follows:

| Fraction | Solvent | Residue, Milligrams | Appearance and M.P. |
|---|---|---|---|
| 1 | Ethylene dichloride | 9 | |
| 2 | 5% Acetone/Skellysolve B | 3 | |
| 3 | do | 6 | |
| 4 | do | 13 | |
| 5 | do | 21 | |
| 6 | do | 18 | |
| 7 | do | 67 | crystalline. |
| 8 | do | 87 | Do. |
| 9 | do | 139 | crystalline, 130–152°. |
| 10 | do | 383 | crystalline, 165–167°. |
| 11 | do | 473 | crystalline, 162–166°. |
| 12 | do | 455 | crystalline, 160–165°. |
| 13 | do | 217 | crystalline, 158–165°. |
| 14 | do | 55 | |
| 15 | do | 24 | |

Fractions 9–13, representing a total of 1.667 grams, were recrystallized from 95 percent ethanol, giving fine silky needles. The needles contained solvent of crystallization which was driven off at temperatures above 125 degrees centigrade giving crystals that melted at 170–171 degrees centigrade. Recrystallization of the product from ethyl acetate yielded transparent prisms, also containing solvent of crystallization, which was driven off at eighty degrees centigrade. The compound, 9(11)-dehydro-2-methyl-desoxycorticosterone acetate, after drying at 120 degrees centigrade had the following analysis.

*Analysis.*—Calculated for $C_{24}H_{32}O_4$: C, 74.96; H, 8.39. Found: C, 75.12; H, 8.34. $[\alpha]_D$ plus 179 degrees in chloroform.

EXAMPLE 15

*9α-bromo-2-methylcorticosterone 21-acetate*

One (1.00) gram of 9(11)-dehydro-2-methyl-desoxycorticosterone acetate was dissolved in a mixture of fifteen milliliters of methylene chloride and 25 milliliters of t-butanol. To this solution was added 0.32 milliliters of seventy percent perchloric acid in 2.5 milliliters of water and 0.424 grams of N-bromo-acetamide in five milliliters of t-butanol at room temperature. After a period of ten minutes the excess reagent was decomposed with 0.5 gram of sodium sulfite dissolved in five milliliters of water, and the methylene chloride was removed by vacuum distillation. The solution was then cooled to zero degrees centigrade, and 100 milliliters of cold water was added slowly. The product, which precipitated, was filtered, washed with water and dried in vacuo at room temperature. Yield of the product, 9α-bromo-2-methyl-corticosterone 21-acetate, was 1.283 grams (102 percent of theoretical) then melted at 93–95 degrees centigrade with decomposition.

EXAMPLE 16

*2-methyl-9β,11β-oxido-desoxycorticosterone acetate*

Following exactly the procedure of Example 11, above, 1.25 grams of 9α-bromo-2-methylcorticosterone 21-acetate was dissolved in acetone and converted with anhydrous sodium acetate under reflux. The final product, after concentration in vacuo, dilution with water and cooling to zero degrees centigrade, gave 0.939 gram of crude product, M.P. 162–172 degrees centigrade. A sample was recrystallized from acetone-Skellysolve B, M.P. 205–207.5 degrees centigrade (softening at 195 degrees centigrade), $[\alpha]_D$ plus 95 degrees in chloroform.

*Analysis.*—Calculated for $C_{24}H_{32}O_5$: C, 71.97; H, 8.05. Found: C, 71.81; H, 8.02.

EXAMPLE 17

*9α-fluoro-2-methylcorticosterone 21-acetate*

Following exactly the procedure of Example 12, but substituting 2-methyl-9β,11β-oxido-desoxycorticosterone acetate produced in Example 16 is productive of 9α-flouro-2-methylcorticosterone 21-acetate. The yield was approximately 44 percent of theoretical, and the product melted at 185–188 degrees centigrade, with slight decolorization.

*Analysis.*—Calculated for $C_{24}H_{33}FO_5$: F, 4.52. Found: F, 4.56.

In the same manner as Examples 14 through 17, 2-ethyl-4,9(11)-pregnadiene-3,20-dione as produced in Example 9 is converted to 9α-fluoro-2-ethyl-corticosterone 21-acetate.

EXAMPLE 18

*2-methyl-9α-fluoro-11-keto-21-acetoxyprogesterone*

Following the procedure of Example 13, the product of Example 17 is oxidized with chromium trioxide in acetic acid to give 2-methyl-9α-fluoro-11-keto-21-acetoxyprogesterone.

In the same manner as Example 12, but substituting 37 percent hydrochloric acid for the hydrofluoric acid, 9α-chloro-2-methylcorticosterone 21-acetate is produced. This compound is then oxidized as in Example 13 with chromium trioxide in acetic acid to produce 2-methyl-9α-chloro-11-keto-21-acetoxyprogesterone.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. 2-methyl-9α-fluoro-11β-hydroxyprogesterone.
2. 2-methyl-9α-fluoro-11-ketoprogesterone.
3. 2-methyl-9α-fluoro-11β-hydroxy-21-acetoxyprogesterone.
4. 2-methyl-11β-hydroxy-21-acetoxyprogesterone.

References Cited in the file of this patent

UNITED STATES PATENTS

| | | |
|---|---|---|
| 2,602,769 | Murray et al. | July 8, 1952 |
| 2,763,671 | Fried | Sept. 18, 1956 |

OTHER REFERENCES

Shoppee et al.: Helv. Chim. Acta, vol. 26, pages 1316–28 (1943).

Fried et al.: J.A.C.S., vol. 74, pages 3962–3 (1952).

Rosenkranz et al.: J. Org. Chem., vol. 17, pages 290–3 (1952).

Fried et al.: J.A.C.S., vol. 75, pages 2273–4 (1953).